(No Model.)

L. J. SMITH.
LOOSE PULLEY.

No. 587,338. Patented Aug. 3, 1897.

Witnesses
H. G. Dieterich
Edwin Cruse

Inventor
Lewis J. Smith

By his Attorneys,
C. A. Snow & Co.

UNITED STATES PATENT OFFICE.

LEWIS J. SMITH, OF SURPRISE, NEW YORK, ASSIGNOR OF ONE-HALF TO THOMAS J. RUNDEL, OF NEW YORK, AND W. S. RUNDEL, OF GREENVILLE, NEW YORK.

LOOSE PULLEY.

SPECIFICATION forming part of Letters Patent No. 587,338, dated August 3, 1897.

Application filed March 10, 1897. Serial No. 626,797. (No model.)

*To all whom it may concern:*

Be it known that I, LEWIS J. SMITH, a citizen of the United States, residing at Surprise, in the county of Greene and State of New York, have invented a new and useful Loose Pulley, of which the following is a specification.

This invention relates to loose pulleys employed in driving machines, its objects being to support the loose pulley on an independent bearing in close proximity to the fast or driving pulley, to provide yielding devices to hold the pulleys separated, and to so construct the two pulleys that when brought in contact with each other the loose pulley will be rotated by the driving-pulley.

With these and other objects in view the invention consists in the novel details of construction and combination of parts herein-after fully described, and particularly pointed out in the claims.

Figure 1:
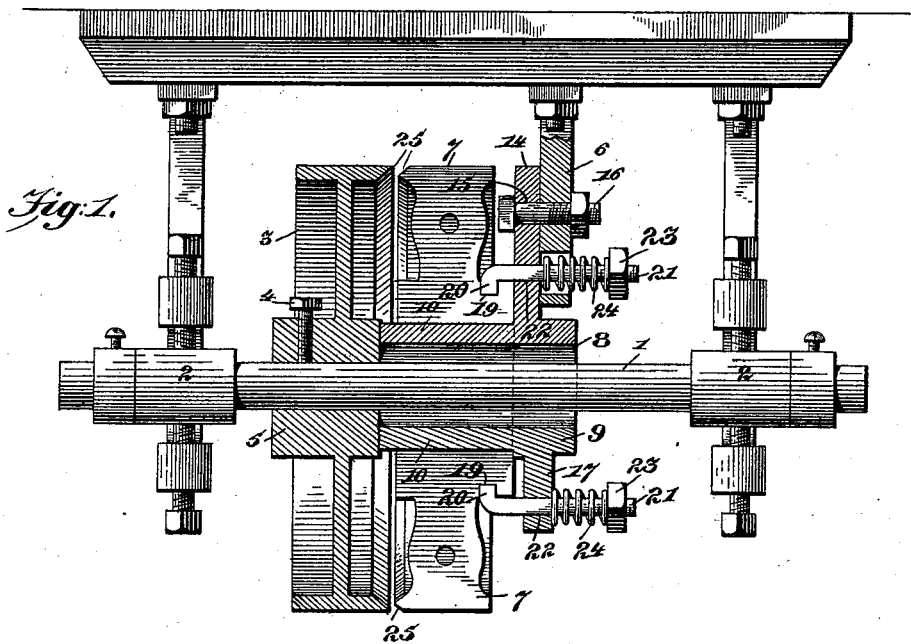
Figure 2:
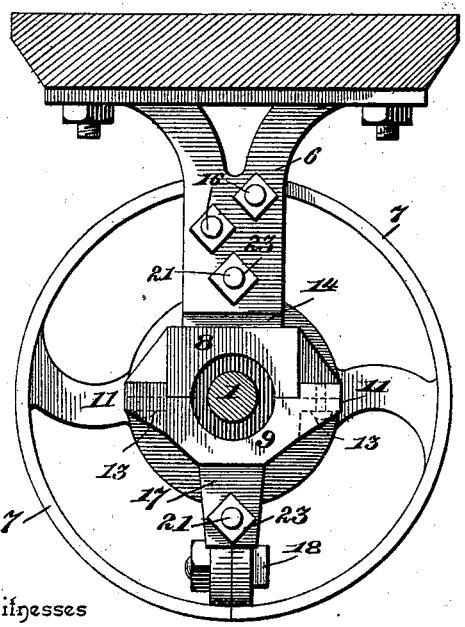
Figure 3:
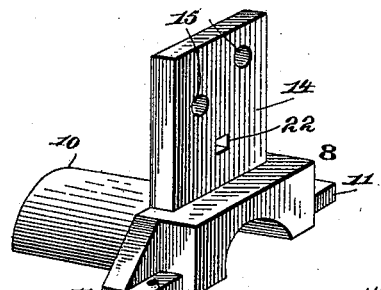
Figure 3:
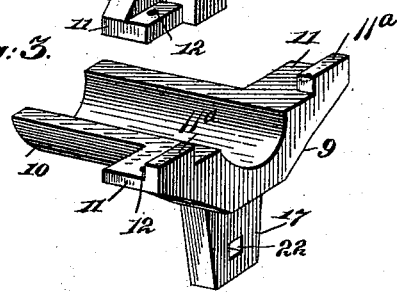

In the drawings, Figure 1 is a sectional elevation of a fast and loose pulley constructed in accordance with my invention. Fig. 2 is a side view of the loose pulley and its support, the driving-shaft being in section. Fig. 3 is a perspective view of the sections of the bearing on which the loose pulley is supported.

Similar reference-numerals indicate similar parts in the several figures.

1 represents the driving-shaft, which is supported in suitable bearings 2, and 3 is the driving-pulley, which is locked to the shaft by means of the set-screw 4, passing through the hub 5 of the pulley.

6 represents a bracket to which the bearing for the loose pulley 7 is bolted. This bearing is made in two sections, (indicated by 8 and 9, respectively,) and each section is provided with a half-sleeve portion 10 and with laterally-projecting lugs 11, which lugs are provided with bolt-holes 12 for the reception of the bolts 13, by means of which two sections are firmly bolted together. At the front edge of each of the lugs 11 on the lower section an upwardly-projecting lug 11ª is formed, and these lugs engage the front edges of the lugs 11 on the upper section and aid in keeping the two sections in position relative to each other.

The section 8 is provided with an upwardly-extending ear or plate 14, which is provided with bolt-holes 15, adapted to register with similar bolt-holes in the bracket 6, and through the registering holes the bolts 16 pass to firmly connect the bearings to the bracket. The section 9 is provided with a downwardly-extending ear or plate 17, for a purpose which will be referred to hereinafter.

The loose pulley 7 is split and its two sections are connected together by bolts 18. The loose pulley is supported on the sleeve 10 of the bearing to turn freely thereon, and its hub is provided on one end with an annular groove 19, into which the hooked ends 20 of the pins 21 project. These pins are angular in cross-section and extend through the angular openings 22 in the plates 14 and 17, respectively. The outer ends of the pins 21 are rounded and threaded for the reception of nuts 23, and coiled springs 24 surround the pins 21 and abut at one end against the ears 14 and 17, respectively, and at their other ends against the nuts 23. The normal tendency of the spring-actuated pins 21 is to hold the loose pulley 7 out of engagement with the fast pulley 3, and in their normal condition the pulleys will occupy the position shown in Fig. 1.

The adjacent edges of the rims of the pulleys 3 and 7 are beveled, as indicated at 25, in order that the rim of one of the pulleys may extend slightly within the rim of the other and have a frictional engagement therewith, whereby both pulleys will have uniform rotation. As shown, the bore of the sleeve 10 is larger than the shaft 1, so that the shaft will turn freely therein, and no wear whatever will occur to the shaft by the mounting or operation of the loose pulley.

The operation of the device is as follows: Assuming that a belt runs from the driving-pulley to the pulley of a machine, when it is desired to stop the machine the belt will be shifted onto the loose pulley and the machine will then stop, and as the bearing on which the loose pulley is supported is absolutely independent of the driving-shaft and does not contact with it in any manner there will be no weight or draft on the shaft as long as the belt is on the loose pulley, and consequently the shaft will not be cut or worn in any manner by the loose pulley or its bearing. When it is desired to shift the belt from the loose to the fast pulley, the weight of the belt will cause sufficient friction between it and the loose pulley to move the loose pulley lengthwise of its bearings against the force of the springs 24 until the beveled edges 25 of the flanges come in frictional contact with each other, when the loose pulley will turn with the fast pulley and thereby facilitate the shifting of the belt from the loose to the fast pulley and at the same time start the machine gradually. As soon as the belt is moved from the loose to the fast pulley the spring-actuated pins 21 move the loose pulley out of engagement with the fast pulley.

By having the loose pulley made in sections and also making the support for the loose pulley in sections it is obvious that they can be readily fitted over any shaft now in use without disturbing it in any manner, and therefore my invention is readily applicable to fast pulleys that may be in use at the present time.

It is to be understood that changes in the form, proportion, and minor details of construction may be resorted to without departing from the spirit or sacrificing any of the advantages of this invention.

Having thus described the invention, what I claim is—

1. The combination with the driving-shaft and a fast pulley thereon, of a supporting-bracket, a sleeve connected to the bracket and fitting loosely over the shaft adjacent to the fast pulley, a loose pulley mounted to turn on the sleeve and having an annular groove in its hub, ears projecting from said sleeve and spring-actuated pins slidably supported in said ears and having hooked ends engaging said groove, substantially as and for the purpose specified.

2. The combination with the driving-shaft and a fast pulley thereon, of a supporting-bracket, a sleeve loosely fitted over the shaft adjacent to the fast pulley and having upwardly and downwardly extending ears each provided with an angular opening, and the upper ear being bolted to the bracket, a loose pulley mounted to revolve on said sleeve and having an annular groove in its hub, pins fitted in said angular openings and having hooked ends engaging the said annular groove and having a nut on their outer ends, and springs interposed between said nuts and the ears on the sleeve, substantially as and for the purpose specified.

3. The combination with the driving-shaft and a fast pulley thereon, of a supporting-bracket, a sleeve fitted loosely over the shaft adjacent to the fast pulley and bolted to the said bracket, ears projecting from said sleeve, a loose pulley mounted to turn on the sleeve and provided with an annular groove in its hub, the adjacent edges of the rims of the fast and loose pulleys being beveled to form friction-clutch surfaces, and spring-actuated pins slidably supported in the said ears and having hooked ends engaging the said annular groove and normally holding the fast and loose pulleys apart but permitting movement of the latter into engagement with the former when the belt is being shipped from the loose to the fast pulley, substantially as described.

4. The combination with the driving-shaft and a fast pulley thereon, of a supporting-bracket, a sleeve formed in two sections fitted loosely over the shaft, the upper section being bolted to the bracket, devices to secure the two sections together, a pulley made in two sections and mounted on the sleeve to turn thereon and provided with an annular groove in its hub, means to secure the two sections of the pulley together, a spring-actuated pin supported in each section of the sleeve, said pins each having a hooked end engaging the annular groove in the hub of the loose pulley, substantially as described.

In testimony that I claim the foregoing as my own I have hereto affixed my signature in the presence of two witnesses.

LEWIS J. SMITH.

Witnesses:
WINFIELD S. RUNDEL,
JOHN H. SANFORD.